(12) United States Patent
Jin et al.

(10) Patent No.: US 10,961,846 B2
(45) Date of Patent: Mar. 30, 2021

(54) MULTI-DIRECTIONAL ULTRASONIC TRANSDUCER FOR DOWNHOLE MEASUREMENTS

(71) Applicant: Halliburton Energy Services, Inc., Houston, TX (US)

(72) Inventors: Jing Jin, Singapore (SG); Adan Herrera, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/545,868

(22) PCT Filed: Sep. 27, 2016

(86) PCT No.: PCT/US2016/053885
§ 371 (c)(1),
(2) Date: Jul. 24, 2017

(87) PCT Pub. No.: WO2018/063143
PCT Pub. Date: Apr. 5, 2018

(65) Prior Publication Data
US 2019/0211672 A1    Jul. 11, 2019

(51) Int. Cl.
*E21B 47/14* (2006.01)
*G01V 1/46* (2006.01)
(Continued)

(52) U.S. Cl.
CPC ............ *E21B 47/14* (2013.01); *B06B 1/0207* (2013.01); *B06B 1/0622* (2013.01); *G01V 1/46* (2013.01);
(Continued)

(58) Field of Classification Search
CPC combination set(s) only.
See application file for complete search history.

(56) References Cited

U.S. PATENT DOCUMENTS 3,325,780 A * 6/1967 Horan .................. B06B 1/0603
                                                         367/164
3,330,375 A * 7/1967 White ...................... G01V 1/44
                                                         367/28
(Continued)

FOREIGN PATENT DOCUMENTS

GB          2430259 A    3/2007
WO    WO 2013/101694 A2    7/2013

OTHER PUBLICATIONS

International Search Report and the Written Opinion of the International Search Authority, or the Declaration, dated Jun. 26, 2017, PCT/US2016/053885, 14 pages, ISA/KR.
(Continued)

*Primary Examiner* — Isam A Alsomiri
*Assistant Examiner* — Amie M Ndure
(74) *Attorney, Agent, or Firm* — Haynes and Boone, LLP

(57) ABSTRACT

Multi-directional ultrasonic transducers useful for small downhole applications where two or more separate or larger transducers are too large. The transducer includes a backing material having two or more piezoelectric elements attached thereto. The piezoelectric elements are attached to the backing such that each elements transmit ultrasounds in different directions. An encapsulating material surrounds both the piezoelectric elements and the backing. Since the piezoelectric elements share the same backing and the same encapsulation, the form factor of the multi-directional transducer is greatly reduced in comparison to conventional transducer designs.

14 Claims, 3 Drawing Sheets

(51) Int. Cl.
   *G01V 1/52* (2006.01)
   *B06B 1/02* (2006.01)
   *B06B 1/06* (2006.01)

(52) U.S. Cl.
   CPC .......... *G01V 1/52* (2013.01); *G01V 2001/526* (2013.01)

(56) References Cited

U.S. PATENT DOCUMENTS

| | | | | |
|---|---|---|---|---|
| 3,583,677 | A * | 6/1971 | Phillips | B06B 1/0611 366/120 |
| 3,821,740 | A * | 6/1974 | Ehrlich | G10K 11/346 342/374 |
| 4,184,562 | A | 1/1980 | Bakamjian | |
| 4,606,014 | A * | 8/1986 | Winbow | G01V 1/44 367/75 |
| 4,649,526 | A * | 3/1987 | Winbow | B06B 1/0633 367/35 |
| 4,774,693 | A * | 9/1988 | Winbow | G01V 1/44 367/27 |
| 4,809,243 | A * | 2/1989 | Bledsoe | G01V 1/208 367/154 |
| 4,827,457 | A * | 5/1989 | Seeman | E21B 47/082 367/27 |
| 4,932,003 | A * | 6/1990 | Winbow | G01V 1/46 367/75 |
| 5,289,433 | A * | 2/1994 | Cowles | G01V 1/201 181/102 |
| 5,423,220 | A | 6/1995 | Finsterwald | |
| 5,471,436 | A * | 11/1995 | Harvey | G01V 1/201 367/154 |
| 5,513,151 | A * | 4/1996 | Morningstar | G01V 1/201 367/154 |
| 5,579,286 | A * | 11/1996 | Skorheim | G01V 1/201 367/154 |
| 5,644,550 | A | 7/1997 | Priest | |
| 5,883,857 | A * | 3/1999 | Pearce | G01V 1/201 367/20 |
| 5,899,958 | A * | 5/1999 | Dowell | E21B 47/0002 175/50 |
| 6,079,508 | A | 6/2000 | Caza | |
| 7,103,949 | B2 | 9/2006 | Rife et al. | |
| 7,150,317 | B2 | 12/2006 | Barolak et al. | |
| 7,393,325 | B2 | 7/2008 | Barthe et al. | |
| 7,446,458 | B2 | 11/2008 | Sasaki | |
| 7,513,147 | B2 * | 4/2009 | Yogeswaren | B06B 1/0622 310/334 |
| 8,027,224 | B2 | 9/2011 | Brown et al. | |
| 8,117,907 | B2 * | 2/2012 | Han | E21B 47/082 73/152.58 |
| 8,125,848 | B2 * | 2/2012 | Geerits | G01V 1/46 367/50 |
| 8,416,098 | B2 | 4/2013 | Garcia-Osuna et al. | |
| 8,575,823 | B2 | 11/2013 | Nishikubo | |
| 8,626,295 | B2 | 1/2014 | Doron et al. | |
| 8,638,640 | B2 | 1/2014 | Brown et al. | |
| 8,696,581 | B2 | 4/2014 | Sverdlik et al. | |
| 8,792,307 | B2 | 7/2014 | DiFoggio | |
| 8,905,934 | B2 | 12/2014 | Nishikubo | |
| 9,228,418 | B2 * | 1/2016 | Badri | E21B 28/00 |
| 9,293,690 | B2 | 3/2016 | Sudol | |
| 10,393,903 | B2 * | 8/2019 | Jin | G01V 1/52 |
| 2002/0089896 | A1 * | 7/2002 | Behrens | G01V 1/38 367/154 |
| 2004/0095847 | A1 * | 5/2004 | Hassan | G01H 5/00 367/25 |
| 2006/0066184 | A1 * | 3/2006 | Sawada | B06B 1/0633 310/369 |
| 2007/0256490 | A1 | 11/2007 | Harthorn et al. | |
| 2007/0297286 | A1 * | 12/2007 | Stenzel | G01V 1/201 367/20 |
| 2009/0222209 | A1 * | 9/2009 | Morys | E21B 47/022 702/9 |
| 2010/0258303 | A1 * | 10/2010 | Alberty | E21B 47/08 166/244.1 |
| 2012/0018524 | A1 * | 1/2012 | Loi | G06K 19/0675 235/492 |
| 2012/0160030 | A1 * | 6/2012 | Pearce | B06B 1/0688 73/753 |
| 2012/0163120 | A1 * | 6/2012 | Pearce | G01V 1/186 367/21 |
| 2013/0018266 | A1 | 1/2013 | Nishikubo et al. | |
| 2014/0056111 | A1 * | 2/2014 | Vu | G01V 1/42 367/180 |
| 2014/0113828 | A1 * | 4/2014 | Gilbert | G01R 33/0354 505/100 |
| 2014/0153368 | A1 | 6/2014 | Bar-Cohen et al. | |
| 2014/0160885 | A1 * | 6/2014 | Tenghamn | G01V 1/3817 367/16 |
| 2014/0198619 | A1 | 7/2014 | Lamb et al. | |
| 2014/0265580 | A1 * | 9/2014 | Cooley | E21B 41/0085 307/47 |
| 2014/0293742 | A1 * | 10/2014 | Pearce | G01V 1/3826 367/20 |
| 2015/0117146 | A1 * | 4/2015 | Pearce | G01V 13/00 367/15 |
| 2015/0198030 | A1 | 7/2015 | Tello et al. | |
| 2015/0275655 | A1 * | 10/2015 | Swett | G01V 1/159 367/83 |

OTHER PUBLICATIONS

Search Report issued for European Patent Application No. 16917857.1, dated Dec. 9, 2019, 8 pages.

* cited by examiner

US 10,961,846 B2

MULTI-DIRECTIONAL ULTRASONIC TRANSDUCER FOR DOWNHOLE MEASUREMENTS

PRIORITY

The present application is a U.S. National Stage patent application of International Patent Application No. PCT/US2016/053885, filed on Sep. 27, 2016, the benefit of which is claimed and the disclosure of which is incorporated herein by reference in its entirety.

FIELD OF THE DISCLOSURE

The present disclosure relates generally to downhole acoustic measurements and, more specifically, to a multi-directional ultrasonic transducer for downhole measurements.

BACKGROUND

Ultrasonic transducers have wide application in nondestructive testing of wellbore downhole environments. For example, ultrasonic transducers have been used in downhole imaging for casing thickness measurement, cement evaluation for cased holes, and formation evaluation for open holes. In such applications, the transducer rotates along the downhole axis, in order to scan over the circumference of the downhole wall. In some applications, transducers are mounted back-to-back on one rotating head, thus enabling scanning of the wellbore. The dual back-to-back design may double the efficiency or provide redundancy in case one of the transducers fails during measurement operations.

However, for wellbores having small diameters, the rotating head may be too small to house two or more transducers. Since two or more conventional transducers may be longer than 3 inches when mounted back-to-back and the wellbore may be less than 3.5 inches, the transducers are simply too large for applications of smaller wellbores. Therefore, the use of multiple transducers, and their accompanying efficiencies and redundancies, is not available.

DESCRIPTION OF ILLUSTRATIVE EMBODIMENTS

Illustrative embodiments and related methods of the present disclosure are described below as they might be employed in multi-directional sonic transducers for downhole environments. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of this disclosure will become apparent from consideration of the following description and drawings.

As described herein, illustrative systems and methods of the present disclosure provide multi-directional ultrasonic transducers having small form factors. Form factor, as used herein, refers to the size and shape of the transducer that determines its fit into the head of the tool. The small form factor of the illustrative multi-directional transducers is useful for smaller downhole applications where two or more separate or larger transducers are too large. In a generalized embodiment, the multi-directional ultrasonic transducer includes a backing material having two or more piezoelectric elements attached thereto. The piezoelectric elements are attached to the backing such that each element transmits ultrasounds in different directions. An encapsulating material surrounds both the piezoelectric elements and the backing. Since the piezoelectric elements share the same backing and the same encapsulation, the form factor of the multi-directional transducer is greatly reduced in comparison to conventional transducer designs.

Figure 1:
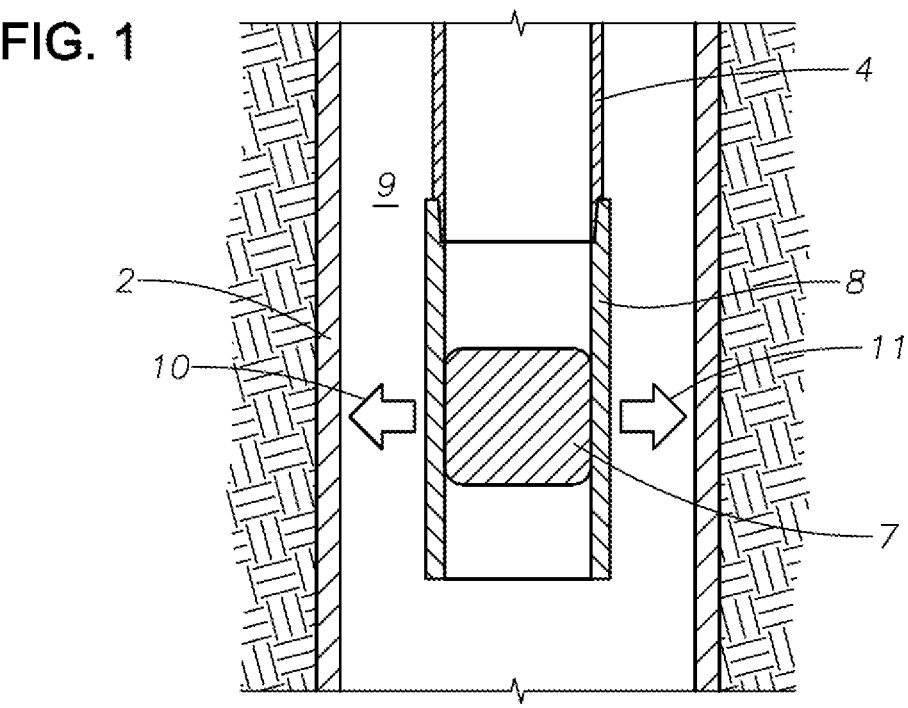
FIG. 1 is a sectional view of a bi-directional ultrasonic transducer on a rotating head positioned along a wellbore, according to certain illustrative embodiments of the present disclosure.

FIG. 1 is a sectional view of a bi-directional ultrasonic transducer on a rotating head positioned along a wellbore, according to certain illustrative embodiments of the present disclosure. In this simplified illustration, a rotating/scanning head 8 is suspending by a conveyance 4 deployed along a cased wellbore 9. In other embodiments, wellbore 9 may be an open hole borehole. Conveyance 4 may be any variety of conveyances, such as, for example, wireline, drilling pipe, slickline, or coiled tubing. In this illustrative embodiment, a bi-directional ultrasonic transducer 7 is positioned within scanning head 8. Although not shown in this example, bi-directional ultrasonic transducer 7 includes two transducers, as described herein, to emit ultrasounds 10 and 11 out toward casing 2 and the surrounding formation in opposite directions. In this example, wellbore 9 may have a diameter as small as 3 inches, while ultrasonic transducer 7 is 2 inches in length and 0.5-3 inches in diameter. Furthermore, for ultrasonic scanning applications, the working frequency of the ultrasound may be, for example, 100 kHz or above.

Figure 2:
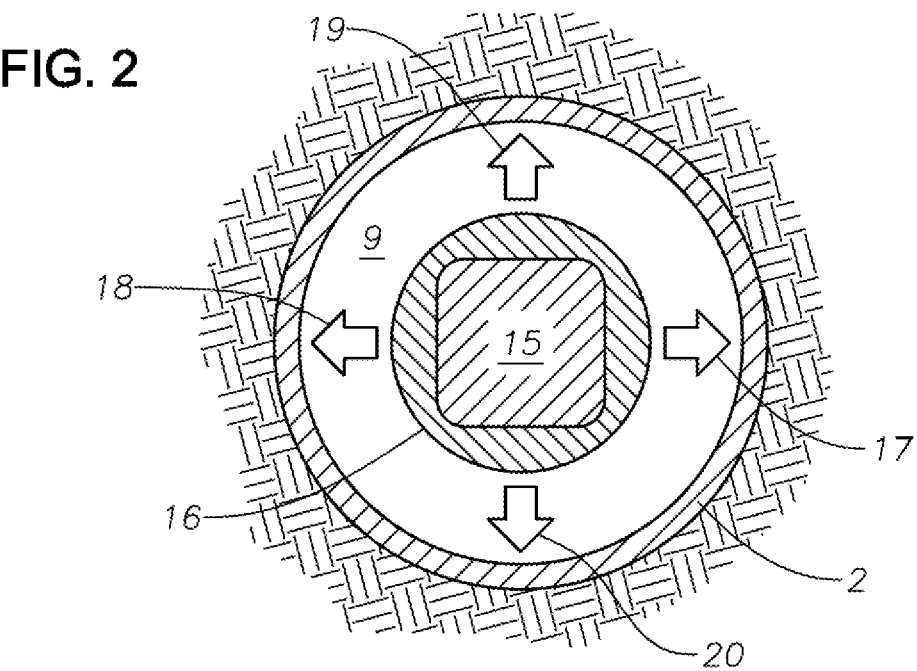
FIG. 2 is a top-down sectional view of a four-directional ultrasonic transducer on a rotating head positioned along a wellbore, according to certain alternative embodiments of the present disclosure.

FIG. 2 is a top-down sectional view of a four-directional ultrasonic transducer on a rotating head positioned along a wellbore, according to certain alternative embodiments of the present disclosure. In this example, a scanning head 16 has been deployed by a conveyance (not shown) along a cased wellbore 9 as previously described. A four-directional ultrasonic transducer 15 is positioned inside scanning head 16. Although not shown in this high level figure, four-directional ultrasonic transducer 15 includes four transducers to transmit ultrasounds 17, 18, 19, and 20 in four different directions toward casing 2 and the surrounding formation.

Figure 3:
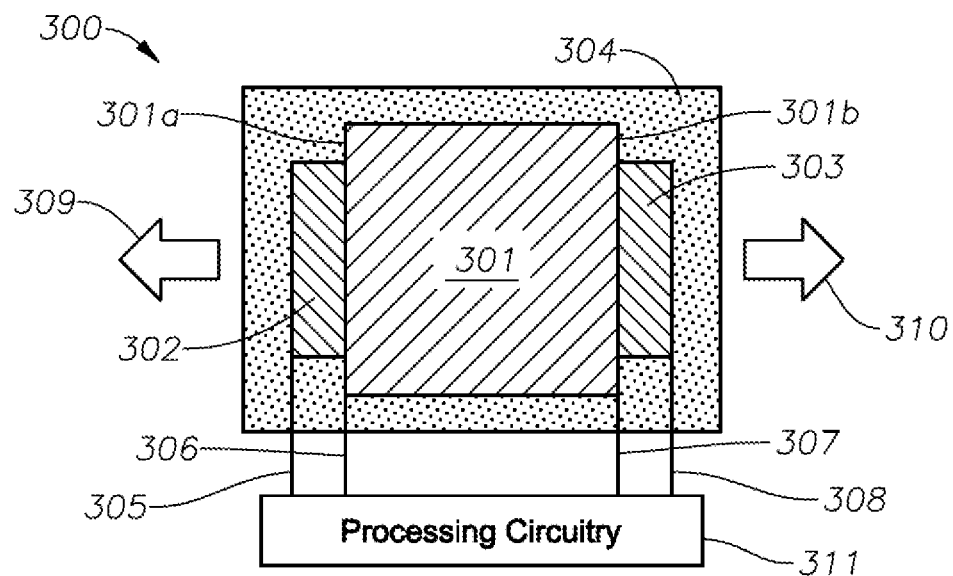
FIG. 3 is a side sectional view of a bi-directional ultrasonic transducer, according to certain illustrative embodiments of the present disclosure.

FIG. 3 is a side sectional view of a bi-directional ultrasonic transducer 300, according to certain illustrative embodiments of the present disclosure. In this example, piezoelectric material 302 and 303 (i.e., piezoelectric elements) are epoxy-bonded onto opposite sides 301a and 301b, respectively, of backing 301. In other illustrative embodiments, piezoelectric elements 302 and 303 may be attached to backing 301 using a variety of other fastening materials or components. After piezoelectric elements 302 and 303 are attached, encapsulation 304 is molded atop piezoelectric elements 302,302 and backing 301, as shown. Backing 301 may be made from a variety of materials that attenuate ultrasounds. As an example, backing 301 may be made from a material such as, for example, tungsten rubber. As another example, backing 301 may be made from an epoxy loaded with particles. In this design, when processing circuitry 311 applies electrical excitation to piezoelectric element 302 via electrical leads 305 and 306, and to piezoelectric element 303 via electrical leads 307 and 308, ultrasounds will emit in opposite directions marked by 309 and 310. In an alternative embodiment, instead of using 4 electrical leads, transducer 300 may work with 3 leads by merging 306 with 307, 305 with 307, 306 with 308, or 305 with 308.

The processing circuitry described herein may take a variety of forms. For example, the processing circuitry may include at least one processor, a non-transitory, computer-readable memory, transceiver/network communication module, and optional I/O devices and user interface, all interconnected via a system bus. Software instructions executable by the processor for implementing the functions of the illustrative ultrasonic logging tools and transducers described herein may be stored in memory.

In certain embodiments, the processing circuitry may be connected to one or more public and/or private networks via one or more appropriate network connections. It will also be recognized that the software instructions to perform the functions of the present disclosure may also be loaded into memory from a CD-ROM or other appropriate storage media via wired or wireless methods.

Moreover, those ordinarily skilled in the art will appreciate that embodiments of this disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. This disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Figure 4:
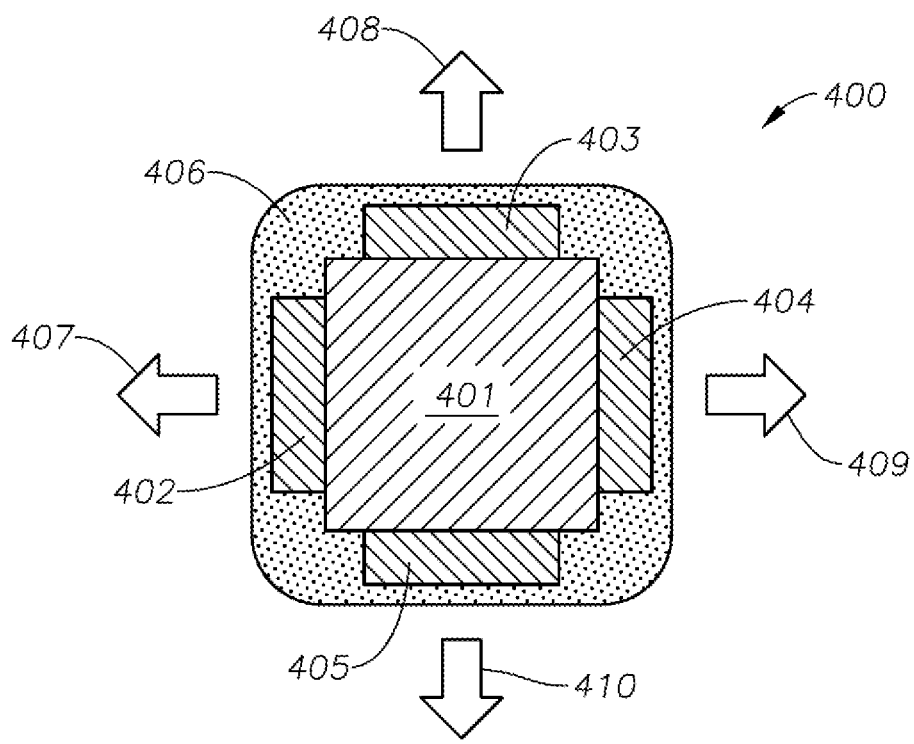
FIG. 4 is a top down sectional view of a four-directional ultrasonic transducer, according to certain illustrative embodiments of the present disclosure.

FIG. 4 is a top down sectional view of a four-directional ultrasonic transducer 400, according to certain illustrative embodiments of the present disclosure. Piezoelectric elements 402, 403, 404 and 405 are attached (e.g., epoxy bonded) to all four sides of backing 401, before being molded in encapsulation 406. In certain illustrative embodiments, backing 401 is made from a material able to attenuate ultrasounds. As an example, the backing material may be made from tungsten rubber. As another example, the backing material may be made from an epoxy loaded with particles. In this design, when electrical excitation is applied by processing circuitry (not shown) to piezoelectric elements 402, 403, 404, and 405, ultrasounds will emit in multi-directions marked by 407, 408, 409, and 410.

In the example of FIG. 4, given the configuration of transducer 400, ultrasounds 407-410 are emitted in directions roughly 90 degrees apart. In alternative embodiments, however, the geometry of transducers 300,400 may be altered as desired to effect the direction of the transmitted ultrasounds. For example, the piezoelectric elements may be of different a geometry, for example, by altering the size or thickness of the elements with dicing, etc., to acquire more information from the downhole ultrasonic measurements.

Figure 5:
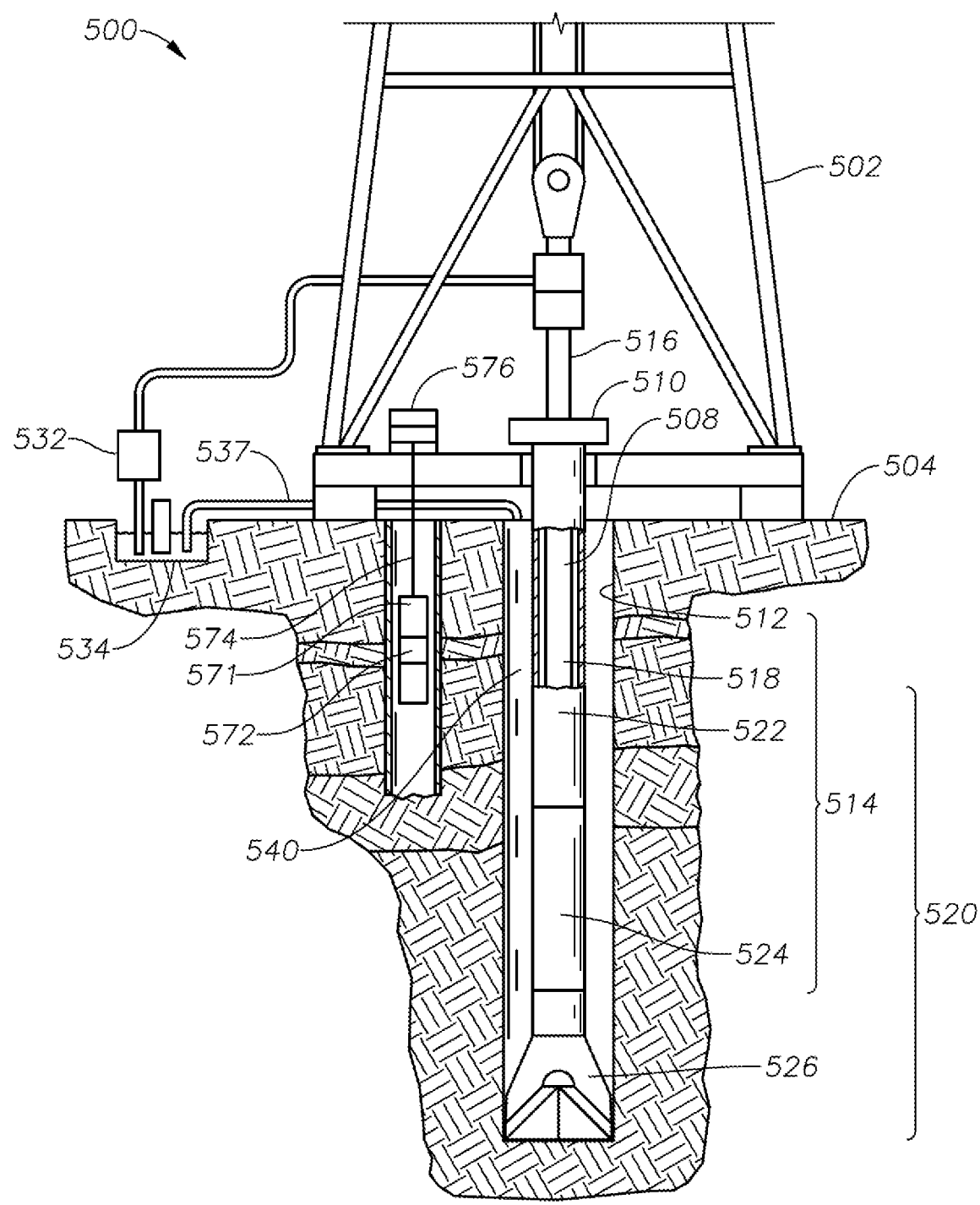
FIG. 5 illustrates a system for ultrasonic logging operations, according to an illustrative embodiment of the present disclosure.

FIG. 5 illustrates a system 500 for ultrasonic logging operations, according to an illustrative embodiment of the present disclosure. It should be noted that the system 500 can also include a system for pumping or other operations. System 500 includes a drilling rig 502 located at a surface 504 of a wellbore. Drilling rig 502 provides support for a downhole apparatus, including a drill string 508. Drill string 508 penetrates a rotary table 510 for drilling a borehole/wellbore 512 through subsurface formations 514. Drill string 508 includes a Kelly 516 (in the upper portion), a drill pipe 518 and a bottomhole assembly 520 (located at the lower portion of drill pipe 518). In certain illustrative embodiments, bottomhole assembly 520 may include drill collars 522, a downhole tool 524 and a drill bit 526. Although downhole tool 524 may be any of a number of different types of tools including measurement-while-drilling ("MWD") tools, logging-while-drilling ("LWD") tools, etc., in this embodiment downhole tool 524 is a logging tool employing one of more of the multi-directional ultrasonic transducers described herein.

During drilling operations, drill string 508 (including Kelly 516, drill pipe 518 and bottom hole assembly 520) may be rotated by rotary table 510. In addition or alternative to such rotation, bottom hole assembly 520 may also be rotated by a motor that is downhole. Drill collars 522 may be used to add weight to drill bit 526. Drill collars 522 also optionally stiffen bottom hole assembly 520 allowing it to transfer the weight to drill bit 626. The weight provided by drill collars 522 also assists drill bit 526 in the penetration of surface 504 and subsurface formations 514.

During drilling operations, a mud pump 532 optionally pumps drilling fluid (e.g., drilling mud), from a mud pit 534 through a hose 536, into drill pipe 518, and down to drill bit 526. The drilling fluid can flow out from drill bit 526 and return back to the surface through an annular area 540 between drill pipe 518 and the sides of borehole 512. The drilling fluid may then be returned to the mud pit 534, for example via pipe 537, and the fluid is filtered. The drilling fluid cools drill bit 526, as well as provides for lubrication of drill bit 526 during the drilling operation. Additionally, the drilling fluid removes the cuttings of subsurface formations 514 created by drill bit 526.

Still referring to FIG. 5, logging tool 524 may also include any number of multi-directional ultrasonic transducers which monitor different downhole characteristics and generate data that is stored within one or more different storage mediums within the downhole tool 524. Alternatively, however, the data may be transmitted to a remote location (e.g., surface processing circuitry communicably coupled thereto) and processed accordingly. Such parameters may include logging data related to the various characteristics of the subsurface formations (such as resistivity, radiation, density, porosity, etc.) and/or the characteristics of the borehole (e.g., size, shape, etc.), etc.

FIG. 5 also illustrates an alternative embodiment in which a wireline system is used to deploy the multi-directional ultrasonic transducers. In such an embodiment, the wireline system may include a downhole tool body 571 coupled to a base 576 by a logging cable 574. Logging cable 574 may include, but is not limited to, a wireline (multiple power and communication lines), a mono-cable (a single conductor), and a slick-line (no conductors for power or communications). Base 576 is positioned above ground and optionally includes support devices, communication devices, and computing devices. Tool body 571 houses any one of the multi-directional ultrasonic transducers 572 described herein. In an embodiment, a power source (not shown) is positioned in tool body 571 to provide power to the tool 571. In operation, the wireline system is typically sent downhole after the completion of a portion of the drilling. More specifically, in certain methods, drill string 508 creates borehole 512, then drill string 508 is removed, and the wireline system is inserted into borehole 512, as will be understood by those ordinarily skilled in the art having the benefit of this disclosure. Note that only one borehole is shown for simplicity in order to show the tools deployed in drilling and wireline applications. In certain applications, such as ranging, multiple boreholes would be drilled as understood in the art.

The multi-directional ultrasonic transducers described herein may be varied in a number of ways. For example, the transducers can consists two or more piezoelectric materials that transmit ultrasounds in multiple directions. The multiple piezoelectric materials share the same backing and the same encapsulation, to reduce the form factor of the multi-directional transducer.

In certain other illustrative embodiments, the multi-directional transducer can be used as a uni-directional transducer. Here, the processing circuitry selects only one piezoelectric element to excite at a time, when transmission is desired in a certain direction. As an embodiment, the electrical excitations to the multiple piezoelectric materials may be different, for example, in amplitude or frequency, to acquire more information from the measurement. In other embodiments, the processing circuitry may selectively excite pairs of piezoelectric elements, or other desired numbers.

In yet other embodiments, the thickness of the encapsulating material covering the piezoelectric elements may be varied. As a result, the transmitted ultrasounds will have different travel times due to the time delay caused by the thickness of the encapsulating material. In other embodiments, the multi-directional transducers can be mounted in the rotating head in an off-centered orientation, which results in different standoffs (i.e., the distance from the transducer surface to the downhole wall), and may provide more information in downhole ultrasonic measurements.

Accordingly, the illustrative multi-directional ultrasonic transducers described herein provide a number of advantages. The disclosed multi-directional transducers have a much smaller form factor in comparison to conventional designs, and hence can be used in a small wellbore where using two or more conventional transducers is not possible. In addition to providing a practical yet simple solution having multiple transmitting directions simultaneously in a small wellbore, the multi-directional transducers are cheaper and lighter than conventional standalone transducers. Thus, it would also be more economical to use the multi-directional transducers in large wellbores.

Embodiments and methods of the present disclosure described herein further relate to any one or more of the following paragraphs:

1. A downhole multi-directional ultrasonic transducer, comprising a backing; two or more piezoelectric elements attached to the backing such that the piezoelectric elements transmit ultrasounds in different directions; and an encapsulating material surrounding the backing and piezoelectric elements.

2. An ultrasonic transducer as defined in paragraph 1, wherein a first piezoelectric element is attached to a first side of the backing; and a second piezoelectric element is attached to a second side of the backing opposite the first side, wherein the ultrasounds generated by the first and second piezoelectric elements are transmitted in opposite directions.

3. An ultrasonic transducer as defined in paragraphs 1 or 2, further comprising a third piezoelectric element is attached to a third side of the backing; and a fourth piezoelectric element is attached to a fourth side of the backing opposite the third side, wherein the ultrasounds generated by the third and fourth piezoelectric elements are transmitted in opposite directions.

4. An ultrasonic transducer as defined in any of paragraphs 1-3, wherein a thickness of the encapsulating material surrounding the piezoelectric elements is different for different piezoelectric elements.

5. An ultrasonic transducer as defined in any of paragraphs 1-4, wherein the piezoelectric elements are selectively excitable.

6. An ultrasonic transducer as defined in any of paragraphs 1-5, wherein the piezoelectric elements have different geometries.

7. An ultrasonic transducer as defined in any of paragraphs 1-6, wherein the ultrasonic transducer is mounted within a head of a wellbore logging tool.

8. An ultrasonic transducer as defined in any of paragraphs 1-7, wherein the ultrasonic transducer is mounted off-center within the head.

9. A downhole multi-directional ultrasonic system, comprising a logging tool to transmit a plurality of ultrasounds in different directions using a multi-directional ultrasonic transducer, the ultrasonic transducer comprising a backing; two or more piezoelectric elements attached to the backing such that the piezoelectric elements transmit ultrasounds in the different directions; and an encapsulating material surrounding the backing and piezoelectric elements; and processing circuitry communicably coupled to the logging tool to determine one or more downhole characteristics using the ultrasounds.

10. An ultrasonic system as defined in paragraph 9, wherein a first piezoelectric element is attached to a first side of the backing; and a second piezoelectric element is attached to a second side of the backing opposite the first side, wherein the ultrasounds generated by the first and second piezoelectric elements are transmitted in opposite directions.

11. An ultrasonic system as defined in paragraphs 9 or 10, further comprising a third piezoelectric element is attached to a third side of the backing; and a fourth piezoelectric element is attached to a fourth side of the backing opposite the third side, wherein the ultrasounds generated by the third and fourth piezoelectric elements are transmitted in opposite directions.

12. An ultrasonic system as defined in any of paragraphs 9-11, wherein a thickness of the encapsulating material surrounding the piezoelectric elements is different for different piezoelectric elements.

13. An ultrasonic system as defined in any of paragraphs 9-12, wherein the piezoelectric elements are selectively excitable.

14. An ultrasonic system as defined in any of paragraphs 9-13, wherein the piezoelectric elements have different geometries.

15. An ultrasonic system as defined in any of paragraphs 9-14, wherein the ultrasonic transducer is mounted within a head of a wellbore logging tool.

16. An ultrasonic transducer as defined in any of paragraphs 9-15, wherein the ultrasonic transducer is mounted off-center within the head.

Furthermore, the illustrative methods described herein may be implemented by a system comprising processing circuitry or a non-transitory computer readable medium comprising instructions which, when executed by at least one processor, causes the processor to perform any of the methods described herein.

Although various embodiments and methods have been shown and described, the present disclosure is not limited to such embodiments and methods and will be understood to include all modifications and variations as would be apparent to one skilled in the art. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed is:

1. A downhole multi-directional ultrasonic transducer, comprising:
   a single backing having a first planar side and a second planar side opposite the first planar side;
   two or more piezoelectric elements, wherein:
      a first piezoelectric element is attached to the first planar side of the backing; and
      a second piezoelectric element is attached to the second planar side of the backing opposite the first side such that the transducer transmits ultrasounds in opposite directions; and
   an encapsulating material which encapsulates the backing and piezoelectric elements.

2. An ultrasonic transducer as defined in claim 1, further comprising:
   a third piezoelectric element is attached to a third planar side of the backing; and
   a fourth piezoelectric element is attached to a fourth planar side of the backing opposite the third side,
   wherein the ultrasounds generated by the third and fourth piezoelectric elements are transmitted in opposite directions.

3. An ultrasonic transducer as defined in claim 1, wherein a thickness of the encapsulating material surrounding one of the piezoelectric elements is different from a thickness of the encapsulating material surrounding another one of the piezoelectric elements.

4. An ultrasonic transducer as defined in claim 1, wherein the piezoelectric elements are selectively excitable.

5. An ultrasonic transducer as defined in claim 1, wherein a geometry of one of the piezoelectric elements is different from a geometry of another one of the piezoelectric elements.

6. An ultrasonic transducer as defined in claim 1, wherein the ultrasonic transducer is mounted within a head of a wellbore logging tool.

7. An ultrasonic transducer as defined in claim 6, wherein the ultrasonic transducer is mounted off-center within the head.

8. A downhole multi-directional ultrasonic system, comprising:
   a logging tool to transmit a plurality of ultrasounds in different directions using a multi-directional ultrasonic transducer, the ultrasonic transducer comprising:
      a single backing having a first planar side and a second planar side opposite the first planar side;
      two or more piezoelectric elements, wherein:
         a first piezoelectric element is attached to the first planar side of the backing; and
         a second piezoelectric element is attached to the second planar side of the backing opposite the first side such that the transducer transmits ultrasounds in opposite directions; and
      an encapsulating material which encapsulates the backing and piezoelectric elements; and
   processing circuitry communicably coupled to the logging tool to determine one or more downhole characteristics using the ultrasounds.

9. An ultrasonic system as defined in claim 8, further comprising:
   a third piezoelectric element is attached to a third planar side of the backing; and
   a fourth piezoelectric element is attached to a fourth planar side of the backing opposite the third side,
   wherein the ultrasounds generated by the third and fourth piezoelectric elements are transmitted in opposite directions.

10. An ultrasonic system as defined in claim 8, wherein a thickness of the encapsulating material surrounding one of the piezoelectric elements is different from a thickness of the encapsulating material surrounding another one of the piezoelectric elements.

11. An ultrasonic system as defined in claim 8, wherein the piezoelectric elements are selectively excitable.

12. An ultrasonic system as defined in claim 8, wherein a geometry of one of the piezoelectric elements is different from a geometry of another one of the piezoelectric elements.

13. An ultrasonic system as defined in claim 8, wherein the ultrasonic transducer is mounted within a head of a wellbore logging tool.

14. An ultrasonic transducer as defined in claim 13, wherein the ultrasonic transducer is mounted off-center within the head.

* * * * *